US012698034B2

(12) United States Patent
Kim et al.

(10) Patent No.: US 12,698,034 B2
(45) Date of Patent: Aug. 4, 2026

(54) STEERING WHEEL DEVICE FOR VEHICLE

(71) Applicant: Autoliv Development AB, Vargarda (SE)

(72) Inventors: Jinkeun Kim, Kanagawa (JP); Yousuke Kato, Kanagawa (JP); Ryohei Yoshihara, Kanagawa (JP); Yutaka Hirota, Kanagawa (JP); Takanori Ikeda, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 292 days.

(21) Appl. No.: 18/574,606

(22) PCT Filed: Jun. 15, 2022

(86) PCT No.: PCT/JP2022/023961
§ 371 (c)(1),
(2) Date: Dec. 27, 2023

(87) PCT Pub. No.: WO2023/276671
PCT Pub. Date: Jan. 5, 2023

(65) Prior Publication Data
US 2024/0317309 A1 Sep. 26, 2024

(30) Foreign Application Priority Data
Jul. 1, 2021 (JP) ................................. 2021-109931

(51) Int. Cl.
*B62D 7/22* (2006.01)
*B60Q 5/00* (2006.01)
*B60R 21/203* (2006.01)

(52) U.S. Cl.
CPC ............. *B62D 7/222* (2013.01); *B60Q 5/003* (2013.01); *B60R 21/2037* (2013.01)

(58) Field of Classification Search
CPC .......... B62D 7/222; B62D 1/10; B60Q 5/003; B60R 21/2037; B60R 21/203
(Continued)

(56) References Cited

U.S. PATENT DOCUMENTS 5,429,508 A * 7/1995 Brevick ................ B60R 16/027
439/19
8,459,686 B2 * 6/2013 Suzuki ................ B60R 21/2037
200/61.54
(Continued)

FOREIGN PATENT DOCUMENTS

JP 63-172027 U1 11/1988
JP 7-254471 A 10/1995
(Continued)

OTHER PUBLICATIONS

Translation of JP2015157536 (Original document published Sep. 3, 2015) (Year: 2015).*

*Primary Examiner* — William A Bolton
(74) *Attorney, Agent, or Firm* — Matthew D. Thayne; Thayne and Davis LLC

(57) ABSTRACT

A steering wheel deice comprising: a horn spring provided between a steering wheel and an airbag module which serves as a damper mass; a damper unit provided on the airbag module; and a pin, one end of which is held by the steering wheel, and at another end of which the damper unit is disposed in a slidable manner. A conduction circuit of a horn includes: the pin which is formed from an electrically conductive material; a horn contact that is provided on the airbag module and that contacts and separates from the pin due to elastic deformation of the horn spring; and a U-shaped spring that is provided to the steering wheel and that conducts by clipping the pin.

8 Claims, 7 Drawing Sheets

(58) Field of Classification Search
     USPC ......... 200/61.55, 61.54, 61.56, 512; 280/731
     See application file for complete search history.

(56) References Cited

U.S. PATENT DOCUMENTS

| | | | | |
|---|---|---|---|---|
| 10,471,987 B2 * | 11/2019 | Trendov | ................. | B62D 7/222 |
| 11,383,751 B2 * | 7/2022 | Kim | ....................... | B62D 7/222 |
| 2020/0101997 A1 * | 4/2020 | Ikeda | ................... | B60R 21/2037 |
| 2020/0130630 A1 * | 4/2020 | Schmeier | .......... | B60R 21/21658 |
| 2020/0282906 A1 * | 9/2020 | Barritault | ................. | H01H 3/60 |
| 2020/0346606 A1 * | 11/2020 | Hirota | .............. | B60R 21/21656 |
| 2021/0001915 A1 * | 1/2021 | Ko | ...................... | B60R 21/2037 |

FOREIGN PATENT DOCUMENTS

| | | | |
|---|---|---|---|
| JP | 2002-283943 A | 10/2002 |
| JP | 2010-69934 A | 4/2010 |
| JP | 2015-157536 A | 9/2015 |
| JP | 2019-64289 A | 4/2019 |
| JP | 2020-19379 A | 2/2020 |

* cited by examiner (a)

(b)

STEERING WHEEL DEVICE FOR VEHICLE

TECHNICAL FIELD

The present invention relates to a vehicle steering wheel device enabling reliably activating the horn while preventing conduction failure of the conductive circuit for sounding the horn even if there is movement in the mounting pin member that connects the steering wheel and airbag module.

BACKGROUND ART

Conventionally, Patent Document 1 is known in relation to a technique that incorporates a horn switch mechanism between the steering wheel and the airbag module.

In the "steering wheel with airbag device" of the patent document 1, the horn switch mechanism is provided with a securing pin that is secured to the core metal of the steering wheel main body as well as a support member that retractably supports the bag holder with respect to the core metal, and a movable equipped member as an insulating part that is interposed as electrical insulation between the securing pin and bag holder. In addition, the horn switch mechanism is provided with a compression coil spring as a biasing member that biases the bag holder away from the core metal, and a contact terminal as a movable side contact part that moves with the bag holder. Furthermore, the contact terminals make contact with the securing pins and conduct based on movement of the bag holder toward the core metal side against the bias force of compression coil spring, activating the horn mechanism of the vehicle.

RELATED ART DOCUMENTS

Patent Documents

Patent Document 1: Japanese Unexamined Patent Application 2010-69934

SUMMARY OF THE INVENTION

Problem to be Solved by the Invention

In conventional technology, the securing pin is a member connecting the core metal with the bag holder. The securing pin is inserted into an insertion hole of the core metal and one side of the securing pin is engaged by a clip. Thus, the securing pin is secured to the core metal in a conductive state. In this manner of structure, when the bag holder is moved toward the core metal to operate the horn causing compression deformation of the compression coil spring, there is a possibility that the securing pin will become inclined relative to the insertion hole. If the securing pin is inclined, instantaneous contact failure may occur if excessive shock vibration is transmitted from the contact terminal to the conduction path across the core metal through the securing pin.

In particular, when vibration damping of the steering wheel is attempted, for example if constructed to transmit steering wheel vibration to a damper unit through the securing pin by providing the damper unit on the bag holder side and enabling the securing pin to slide in the damper unit, the securing pin is further anticipated to move while inclined. Therefore, there is demand for measures for reliable conduction between the contact terminal and the core metal.

The present invention was conceived in light of the conventional problems described above and an object thereof is to provide a vehicle steering wheel device enabling reliable operation of the horn by preventing conduction failure of the conductive circuit that causes the horn to sound even if there is movement of the mounting pin member that connects the steering wheel and the airbag module.

Means for Solving the Problem

The vehicle steering wheel device according to the present invention is a vehicle steering wheel device, including:
an elastically deformable horn spring provided between the steering wheel and the airbag module supporting the airbag module on the steering wheel; and
a mounting pin member having a first end retained in the steering wheel and a second end retained in the airbag module, relatively movably connecting the airbag module to the steering wheel, wherein
a conductive circuit that energizes a horn device for sounding the horn includes:
the mounting pin member being formed of a conductive material;
a horn contact provided on the airbag module that contacts with and separates from the mounting pin member due to elastic deformation of the horn spring; and
an electrode member provided on the steering wheel side that clips to the mounting pin member and conducts with the mounting pin member.
The airbag module is desirably a damper mass, wherein
a damper unit is provided on the airbag module for damping vibration of the steering wheel,
the damper unit is slidably provided on the second end of the mounting pin member, and
the mounting pin member transmits steering wheel vibration to the damper unit.
The electrode member is desirably a U-shaped spring that sandwiches and retains the mounting pin member.
A collar member for retaining the mounting pin member is desirably provided on the steering wheel, wherein a spring seat that is pushed toward the steering wheel by the elasticity of the horn spring is provided on the collar member, and the electrode member is retained between the spring seat and the steering wheel.
The collar member is desirably provided in a press-fit state on the steering wheel so that the spring seat pushes the electrode member toward the steering wheel.
The collar member is desirably provided with an engaging part that engages with the electrode member. The electrode member desirably conducts with the terminal provided on the steering wheel. The power supply side and grounding side of the conductive circuit are desirably configured by a clock spring.

Effect of the Invention

For the vehicle steering wheel device according to the present invention, the horn can be reliably operated while preventing conduction failure of the conductive circuit that sounds the horn even if there is movement in the mounting pin member that connects the steering wheel to the airbag module.

DESCRIPTION OF THE PREFERRED EMBODIMENTS

Figure 1:
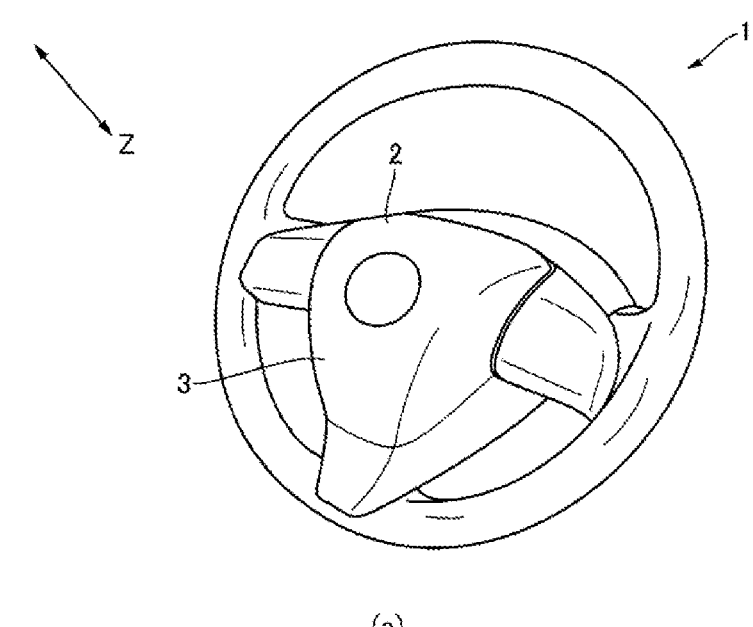
FIG. 1 is a perspective view illustrating an overview of a suitable embodiment of a vehicle steering wheel device according to the present invention.
Figure 1:
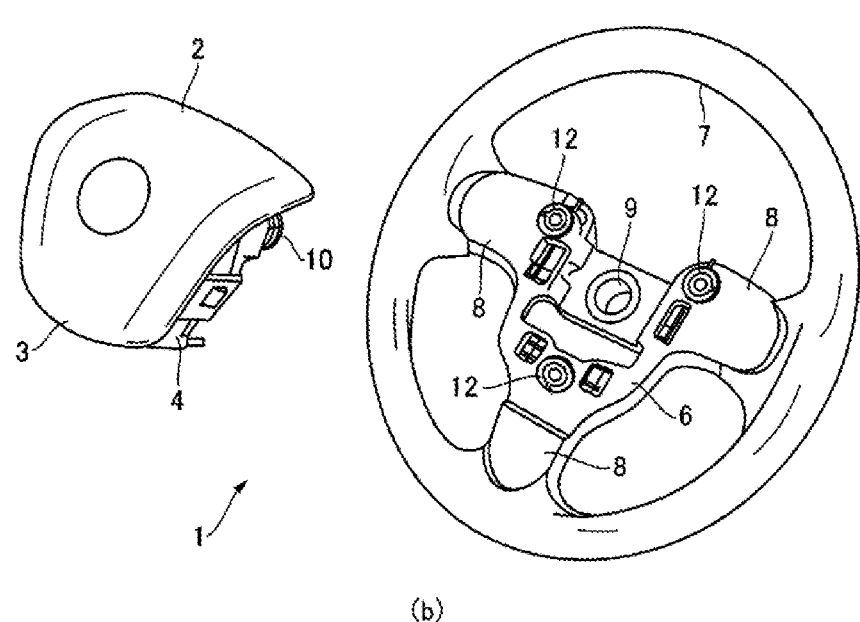

A suitable embodiment of the vehicle steering wheel device according to the present invention is described in detail below with reference to the accompanying drawings. FIG. 1 is a perspective view illustrating an overview of the vehicle steering wheel device according to the present embodiment. FIG. 1(*a*) depicts the overall appearance of a steering wheel 1. FIG. 1(*b*) depicts an exploded state with an airbag module 2 removed from the steering wheel 1. In the description below, the side facing the driver shall be described as the front side and the opposite side as the back side.

The steering wheel 1 is installed at the driver seat of the vehicle. The steering wheel 1 is connected to a steering shaft passing through the interior of a steering column. The steering wheel 1 transmits steering operation of the steering wheel 1 by the driver to a steering gear and the like.

An airbag module 2 with a built-in airbag cushion is mounted on the steering wheel 1. A resin horn cover 3 that constitutes a design surface covers the driver side of the airbag module 2.

The back side of the horn cover 3 is composed of a box-shaped housing 4. An airbag cushion and an inflator that supplies inflator gas to the airbag cushion are stowed inside the housing 4.

When inflator gas is supplied from the inflator to the airbag cushion in an emergency, the airbag cushion cleaves the horn cover 3, expands and deploys into the vehicle cabin space, and restrains and protects the driver.

The airbag module 2 normally functions as a horn button that the driver presses toward the steering wheel 1 in the Z direction in the diagram for sounding the horn.

The airbag module 2 further functions as a damper mass. Therefore, a damper unit 10 for damping vibration of the steering wheel 1 is provided on the airbag module 2.

First, the mounting structure of the airbag module 2 and the steering wheel 1 will be described.

The steering wheel 1 is composed of a metal core metal member that is electrically conductive.

The core metal member is composed of a center boss part 6, an annular rim part 7 gripped by the driver, and spoke parts 8 that connect the boss part 6 and rim part 7. The boss part 6 has a shaft hole 9 formed that connects to the steering shaft.

Figure 2:
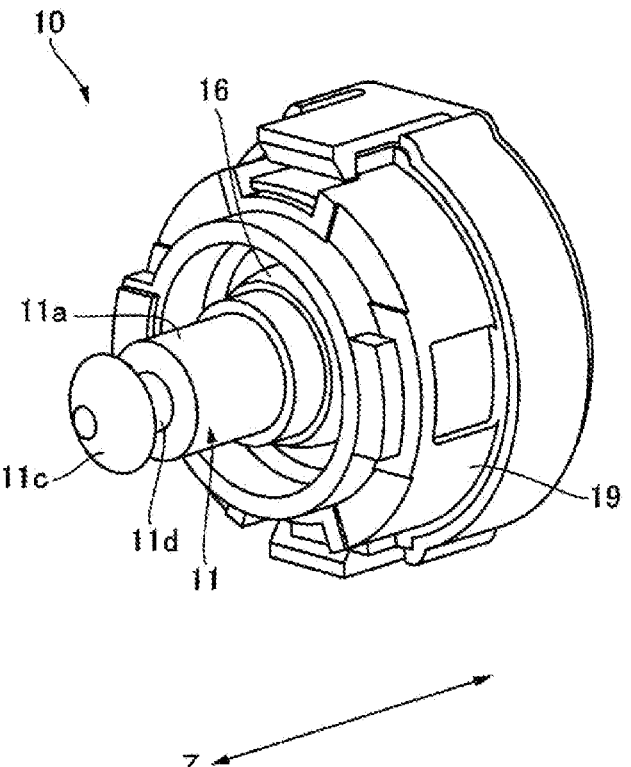
FIG. 2 is a perspective view illustrating an example of a damper unit provided on the vehicle steering wheel device depicted in FIG. 1.

As depicted in FIG. 1 and FIG. 2, a plurality of damper units 10 are arranged in the housing 4 of the airbag module 2 that constitutes the damper mass.

Figure 3:
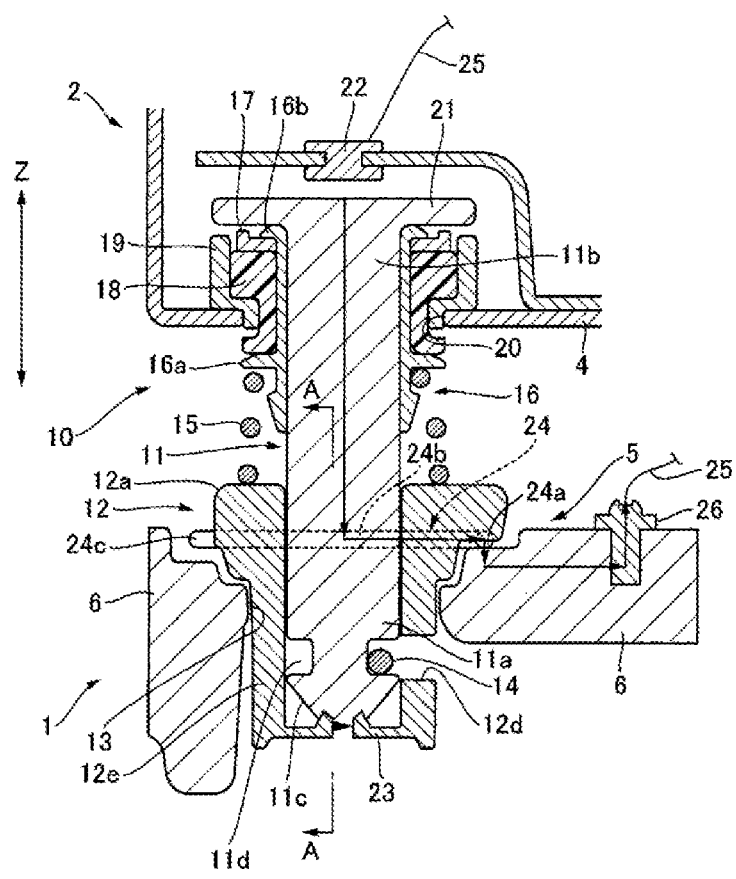
FIG. 3 is an enlarged cross-section view of the essential parts describing the effect of the vehicle steering wheel device illustrated in FIG. 1.

As depicted in FIG. 2 and FIG. 3, rod shaped mounting pin members (hereinafter simply "pin") 11 are provided in the damper units 10 protruding in the Z direction toward the boss part 6 of the steering wheel 1.

A first end 11*a* of the pin 11 in the length direction is mounted to the boss part 6 of the steering wheel 1 and a second end 11*b* in the length direction is mounted to the damper unit 10 on the airbag module 2 side. Thereby, the pin 11 is provided between the airbag module 2 and the steering wheel 1.

The pin 11 transmits the steering wheel 1 vibration to the damper unit 10. The pin 11 is formed of an electrically conducive material to constitute a conductive circuit 5 described below for conducting with the horn device to sound the horn.

In addition, as described below, an elastically deformable horn spring 15 that is a compressed coil spring is provided between the steering wheel 1 and the airbag module 2 encircling the pin 11.

The horn spring 15 elastically supports the airbag module 2 from the steering wheel 1.

The damper unit 10 to which the second end 11*b* of the pin 11 is mounted will be briefly described. As depicted in FIG. 2 and FIG. 3, the damper unit 10 is composed of an inner sleeve 16, an annular seat 16*a* formed to expand outward from the inner sleeve 16, an annular flange 16*b* formed facing outward on the inner sleeve 16 and arranged opposite the annular seat 16*a*, an annular piece 17 that engages with the annular flange 16*b*, an annular shaped elastic body 18 for damping vibration provided between the annular piece 17 and the annular seat 16*a* and encircling the inner sleeve 16, and an annular outer sleeve 19 provided covering the outside of the elastic body 18.

The outer sleeve 19 is mounted in a through hole 20 formed in the housing 4. The damper unit 10 is thus secured to the airbag module 2.

The second end 11*b* of the pin 11 described above that is slidable relative to the inner sleeve 16 penetrates into the inner sleeve 16.

A plate shaped head part 21 is formed on the tip end of the second end 11*b* of the pin 11 so as to cover the annular piece 17.

Vibration of the steering wheel 1 is transmitted from the pin 11 to the elastic body 18 via the inner sleeve 16 and from the head part 21 to the elastic body 18 via the annular piece 17. Thus, the elastic body 18 damps the steering wheel 1 vibration with the airbag module 2 as a damper mass.

In addition, the head part 21 is engaged by means of the inner sleeve 16 in the damper unit 10 in a way that it cannot be pulled out. Therefore, the pin 11 is inserted with respect to the damper unit 10 through the front towards the back.

Figure 4:
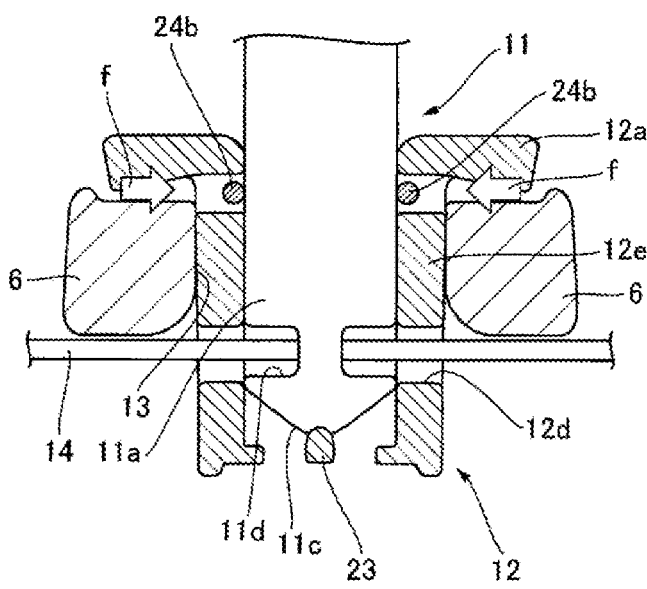
FIG. 4 is a cross section view taken along the line A-A in FIG. 3.

The boss part 6 of the steering wheel 1 that the first end 11*a* of the pin 11 is mounted to is briefly described. As depicted in FIG. 3 and FIG. 4, a through hole 13 for the first end 11*a* of the pin 11 to be inserted into from the front toward the back is formed in the boss part 6. The collar member 12 is mesh secured in a press-fit state through press fitting in the through hole 13.

The collar member 12 is made of a synthetic resin having electrical insulation properties. The collar member 12 includes a main body part 12*e* inserted into the through hole 13 of the boss part 6 and an annular flange part 12*a*.

The main body part 12e is formed in a hollow tube shape. The main body part 12e includes a circular opening at a first end in the length direction for inserting the first end 11a of the pin 11 thereinto.

The flange part 12a is formed at the first end of the main body part 12e in the length direction extending outward around the main body part 12e.

The flange part 12a overlaps with the boss part 6 around the outside of the through hole 13 when the main body part 12e is fitted into the through hole 13.

In other words, when the collar member 12 is secured to the through hole 13, the back surface of the flange part 12a is provided pressed against the surface of the boss part 6.

The flange part 12a also serves as a spring seat for the horn spring 15.

The main body part 12e of the collar member 12 is formed in a truncated cone shape with the outer diameter dimension and inner diameter dimension gradually narrowing from the first end on the flange part 12a side to the second end in the length direction (Z direction).

By forming in a truncated cone shape, the collar member 12 is firmly fitted and secured in the through hole 13 when pressed into the boss part 6 from the front to the back.

A seat part 23 for seating a cone body part 11c formed at the tip end of the first end 11a of the pin 11 is integrally formed using resin molding to the collar member 12 at an end part on the side opposite the end part on the flange part 12a side.

The collar member 12 has a positioning groove part 12d formed at a position on the back side of the boss part 6.

The positioning groove part 12d is formed in a lateral orientation on the main body part 12e of the collar member 12 and intersects with the length direction of the collar member 12.

Figure 5:
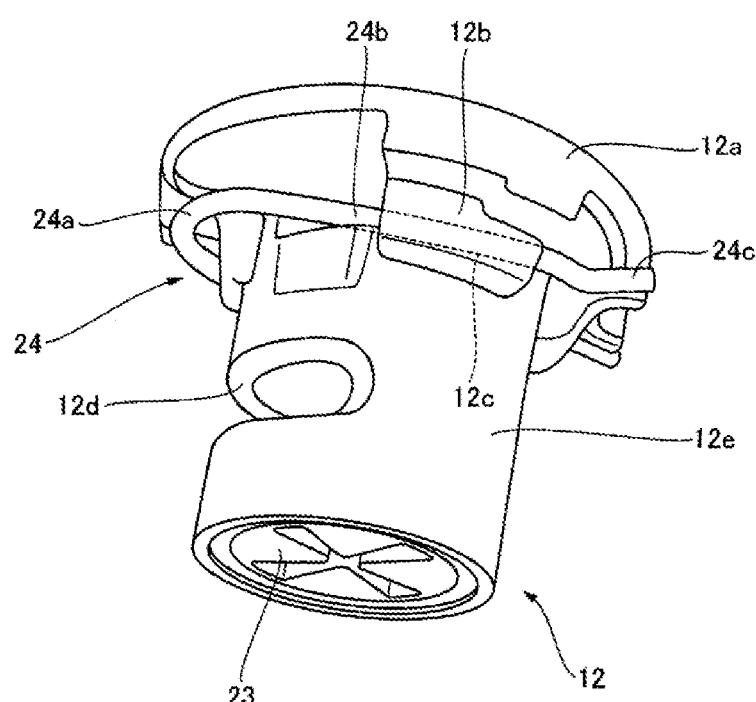
FIG. 5 is a perspective view depicting a state of providing a U-shaped spring on a collar member provided on the vehicle steering wheel device depicted in FIG. 1.

As illustrated in FIG. 5, the positioning groove part 12d is formed so as to appear to be substantially half the circumference of the outer circumferential surface of the collar member 12.

An axially-shaped spring member 14 is inserted into the positioning groove part 12d.

The spring member 14 is provided through the positioning groove part 12d in contact with the back surface of the boss part 6 and intersects with the length direction of the collar member 12.

Therefore, the spring member 14 is inserted and installed in the positioning groove part 12d elastic-deformably supported on the boss part 6.

The spring member 14 elastically deforms enabling the cone body part 11c of the pin 11 inserted into the collar member 12 to be pushed outward upon passing through the positioning groove part 12d.

The spring member 14 is elastically restored when the cone body part 11c is seated on the seat part 23. Thus, the spring member 14 is elastic-detachably engaged with the engaging groove part 11d of the pin 11 enabling capturing the pin 11 together with the seat part 23. As a result, the spring member 14 retains the pin 11 on the collar member 12 (assembly method called "snap in").

Therefore, the first end 11a of the pin 11 is retained on the seat part 23 in the length direction of the collar member 12 and the engaging groove part 11b is engaged by the spring member 14 and is retained on the boss part 6.

The pin 11 with the first end 11a retained on the boss part 6 and the damper unit 10 slidably provided on the second end 11b connects the airbag module 2 to the steering wheel 1 enabling relative movement in the Z direction.

In addition, the pin 11 transmits vibration of the steering wheel 1 to the damper unit 10.

Here, regarding relative movement in the Z direction by the airbag module 2, relative movement of getting closer to the steering wheel 1 is called forward and relative movement getting farther away from the steering wheel 1 is called backward.

The horn spring 15 is elastic-deformably provided in compression between the surface of the flange part 12a of the collar member 12 and the surface of the annular seat 16a of the inner sleeve 16.

The horn spring 15 elastically retains the airbag module 2 away from the steering wheel 1.

The horn spring 15 is normally elastically biased in a direction separating the airbag module 2 from the steering wheel 1 and the reaction force strongly biases the flange part 12a of the collar member 12 towards the boss part 6.

The elastic biasing force of the horn spring 15 passes from the engaging flange part 16b of the inner sleeve 16 through the head part 21 on the second end 11b side of the pin 11 and the spring member 14 engaged with the engaging groove part 11d on the first end 11a side of the pin 11 and is received by and terminates at the boss part 6.

Regarding the airbag module 2, when a push operation is performed in the Z direction toward the steering wheel 1, the damper unit 10 slides forward relative to the pin 11 in conjunction with elastic deformation in compression of the horn spring 15.

Regarding the airbag module 2, when the push operation is released, the elastic restoring force of the horn spring 15 causes the damper unit 10 to slide backward in the opposite direction relative to the pin 11.

Next, the conductive circuit 5 that sounds the horn when connecting with the horn device will be described.

A horn contact 22 that is electrically conductive is provided on the housing 4 of the airbag module 2 arranged opposite in the Z direction from the electrically conductive head part 21 of the pin 11. The horn contact 22 is connected to electrical wiring 25. Hereinafter, conductivity refers to electrical conductivity.

The horn contact 22 contacts and separates from the head part 21 of the pin 11 when the horn spring 15 elastically deforms.

Specifically, when the horn spring 15 is elastically deformed in compression, the damper unit 10 slides relative to the pin 11 retained in the boss part 6. As the damper unit 10 slides, the airbag module 2 moves forward and the horn contact 22 of the housing 4 comes into contact with the head part 21 of the pin 11.

On the other hand, when elastic deformation in compression of the horn spring 15 is released, the horn spring 15 is elastically restored and the damper unit 10 slides in the opposite direction relative to the pin 11. In conjunction with sliding of the damper unit 10 in the opposite direction the airbag module 2 moves backward and the horn contact 22 separates from the head part 21.

In this manner, through separation and contact of the horn contact 22 and the head part 21 of the pin 11 through forward and backward movement of the airbag module 2, conductivity is turned ON and OFF.

An electrode member is provided on the boss part 6 of the steering wheel 1 that conducts with the pin 11 by clipping to the pin 11 to establish conductivity from the pin 11 to the boss part 6.

In this embodiment the electrode member is composed of a U-shaped spring 24 formed of conductive material.

The U-shaped spring 24 is provided on the steering wheel 1 side inserted between the boss part 6 and the flange part 12a of the collar member 12 provided overlapped with the boss part 6. Specifically, the U-shaped spring is provided and inserted between the surface of the boss part 6 and the back surface of the flange part 12a.

Figure 6:
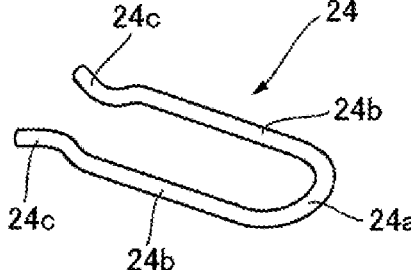
FIG. 6 is a perspective view depicting the U-shaped spring of FIG. 3 and FIG. 4.

As depicted in FIG. 6, the U-shaped spring 24 is composed of a curved part 24a, a pair of straight parts 24b extending in parallel from the end part of the curved part 24a, and a bent over part 24c formed at the tip end of the straight part 24b to prevent pulling out.

The U-shaped spring 24 is provided so as to intersect with the pin 11. Specifically, the side surfaces of the pair of straight parts 24b of the U-shaped spring 24 extending in the length direction sandwich both sides of the pin 11.

The spacing dimension between the pair of straight parts 24b is set to a dimension narrower than the outer diameter dimension of the pin 11 so that when the straight parts 24b sandwich the pin 11, the straight parts 24b bend and deform causing a tension force and this tension force generates the sandwich effect (see f in FIG. 4). This establishes a conductive state between the pin 11 and the U-shaped spring 24 at all times.

An engaging part for retaining the straight parts 24b is provided on the main body part 12e of the collar member 12 for retaining the U-shaped spring 24 on the main body part 12e.

As depicted in FIG. 5, in detail the engaging part is composed of a through hole 12c that the straight part 24b is inserted into. The through holes 12c are formed through a pair of bulging parts 12b integrally formed on the back surface side of the flange part 12a where the U-shaped spring 24 is arranged.

The through holes 12c are formed connected to the inside of the main body part 12e to ensure sandwiching of the pin 11 by the straight parts 24b.

The bent over part 24c prevents pulling out of the U-shaped spring 24 inserted into the through hole 12c from the through hole 12c, thereby restricting loss from the collar member 12.

The U-shaped spring 24 is provided sandwiched between the front side of the boss part 6 and the back side of the flange part 12a of the collar member 12, which also serves as the spring seat of the horn spring 15.

Therefore, the U-shaped spring 24 is sandwiched against the boss part 6 in a state of being pressed against the boss part 6 by the elastic biasing force of the horn spring 15 acting via the spring seat.

In particular, when the horn is operated, an elastic bias force strengthened by compression deformation of the horn spring 15 acts on the U-shaped spring 24.

The U-shaped spring 24 is provided in a highly pressed state against the boss part 6 by the flange part 12a of the collar member 12 provided in a pressed fit state on the boss part 6.

The boss part 6 that is in conduction with the U-shaped spring 24 is connected to electrical wiring 25. The boss part 6 is preferably provided with a terminal on the conductive circuit 5 to ensure conductivity.

The terminal may be a tapping screw 26 formed of a conductive material threaded into the boss part 6 that provides connection with the electrical wiring 25.

In addition, the conductive circuit 5 is preferably composed of a conventionally known clock spring constituting the feed and ground sides of the electrical wiring 25. The horn device is connected to the clock spring.

One of the horn contact 22 on the airbag module 2 side or the U-shaped spring 24 on the steering wheel 1 side may be connected to power via the electrical wiring 25 through the clock spring and the other may be grounded.

Of course, in addition to the clock spring, other conventionally known current paths may be used to constitute the conductive circuit 5.

Next, operation of the vehicle steering wheel device according to the present invention will be described.

First, the assembly will be described. Regarding the steering wheel 1 side, the U-shaped spring 24 is attached to the collar member 12 by inserting the pair of straight parts 24b into the through holes 12c of the pair of bulging parts 12b.

The collar member 12 provided on the U-shaped spring 24 is inserted into the through hole 13 and is meshed and secured to the boss part 6 in a press-fit state. Thus, the U-shaped spring 24 is arranged on the steering wheel 1 side.

The U-shaped spring 24 is provided tightly sandwiched between the boss part 6 and the flange part 12a.

In addition, the electrical wiring 25 is connected to the boss part 6 using a tapping screw 26. Connecting of the electrical wiring 25 should be performed before assembly is complete.

Regarding the airbag module 2 side, the electrical wiring 25 is connected to the horn contact 22 beforehand.

An inner sleeve 16, slidable with the pin 11, is inserted into the damper unit 10 such that the head part 21 of the second end 11b of the pin 11 faces the horn contact 22.

The damper unit 10 with the pin 11 attached is mounted in the through hole 20 of the housing 4. Thus, the pin 11 is attached to the airbag module 2.

Furthermore, the horn spring 15 is installed on the back side of the annular seat 16a so as to surround the pin 11.

Next, the airbag module 2 is attached to the steering wheel 1.

With the horn spring 15 in contact with the surface of the flange part 12a of the collar member 12, the cone body part 11c on the first end 11a side of the pin 11 is inserted into the collar member 12.

Thereafter, the horn spring 15 is compressed and deformed to orient the pin 11 toward the seat part 23 and thereby, the cone body part 11c is seated on the seat part 23.

Here, with elastic deformation, the spring member 14 snaps into the engaging groove part 11d of the pin 11. Therefore, the pin 11 is retained on the steering wheel 1 by means of the collar member 12.

This completes the connection of the airbag module 2 to the steering wheel 1.

Finally, the electrical wiring 25, which is connected to the horn contacts 22 and tapping screws 26, is connected to the clock spring connected to the horn device.

The vehicle steering wheel device according to the present embodiment assembled in this manner (1) functions as protection of the driver by the airbag cushion expanding and deploying in an emergency and (2) exhibits a function of the damper unit 10 damping vibration of the steering wheel 1.

Furthermore, the vehicle steering wheel device according to the present embodiment (3) exhibits a function of sounding the horn.

The driver pushes the airbag module 2 towards the steering wheel 1 to cause the horn to sound.

When pushed, the airbag module 2 moves forward, the horn spring 15 is compressed and elastically deforms, the damper unit 10 slides relative to the pin 11, and the horn contact 22 comes into contact with the head part 21 of the pin 11.

This enables the horn contact 22 to conduct with the U-shaped spring 24 via the pin 11, conducting from the U-shaped spring 24, through the boss part 6, and to the tapping screw 26, and energizing the conductive circuit 5.

Conduction of the conductive circuit 5 energizes the horn device via the clock spring and causes the horn to sound.

When the driver releases the push operation on the airbag module 2, the airbag module 2 moves backward by means of the elastic restoring force of the horn spring 15, the damper unit 10 slides in the reverse direction relative to the pin 11, and the horn contact 22 separates from the head part 21.

Thus, energization of the conductive circuit 5 is interrupted, stopping sounding of the horn.

With the vehicle steering wheel device according to the present embodiment, an electrode member, for example a U-shaped spring 24, is provided in the steering wheel 1 that is clipped to and conducts with the pin 11, which inclines or the like when damping vibration of the steering wheel 1. Therefore, conduction between the steering wheel 1 and the pin 11 can be stably and reliably achieved by the U-shaped spring 24, enabling preventing operation failure of the horn due to current failure.

The electrode member is composed of the U-shaped spring 24 and the U-shaped spring 24 sandwiches and retains the pin 11. Therefore, the U-shaped spring 24 itself has a simple configuration, a simple mounting, preventing conduction failure with a simple configuration.

The U-shaped spring 24 is sandwiched between the flange part 12a of the collar member 12 and the boss part 6 of the steering wheel 1 and the U-shaped spring 24 is pushed towards the boss part 6 by the elastic biasing force of the horn spring 15 through the flange part 12a, thus enabling firm contact of the U-shaped spring 24 on the boss part 6, more reliably preventing energization failure.

The collar member 12 with the flange part 12a that presses the U-shaped spring 24 onto the boss part 6, is provided in the boss part 6 in a press-fit state. Therefore, the U-shaped spring 24 is firmly in contact with the boss part 6 based on the retention force retaining the collar member 12 on the boss part 6, enabling more reliably preventing energization failure.

A through hole 12c for engaging the U-shaped spring 24 is provided on the collar member 12. Therefore, during assembly, the collar member 12 can be mated with the boss part 6 having the U-shaped spring 24 assembled to the collar member 12, thus enabling improving assemblability.

A terminal such as the tapping screw 26 that connects to the electrical wiring 25 is provided on the boss part 6, and thus conduction between the terminal and the U-shaped spring 24 is achieved via that boss part 6. Therefore, conduction of the conductive circuit 5 is more reliable.

The conductive circuit 5 is composed of the clock spring connected to the horn device and the clock spring is used to establish the power supply side and the ground side. Therefore, a conductive circuit that utilizes existing conduction paths can easily be configured.

Figure 7:
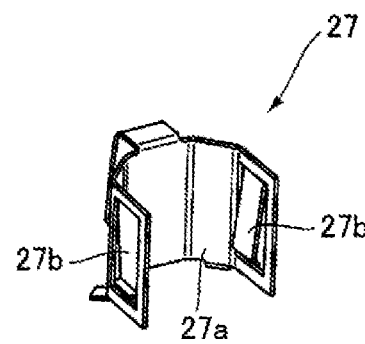
FIG. 7 is a perspective view depicting a modified example of an electrode member used in the vehicle steering wheel device according to the present invention.

FIG. 7 depicts a modified example of the electrode member. The electrode member 27 includes an expandable flexible vertical wall part 27a and a contact piece 27b with spring properties formed on the vertical wall part 27a. The electrode member 27 is inserted into the main body part 12e of the collar member 12.

Conduction is ensured through elastic contact of the contact piece 27b on the circumferential surface of the pin 11 inserted into the collar member 12. Of course, even this manner of modified example will exhibit the same function effect as the embodiment described above.

Figure 8:
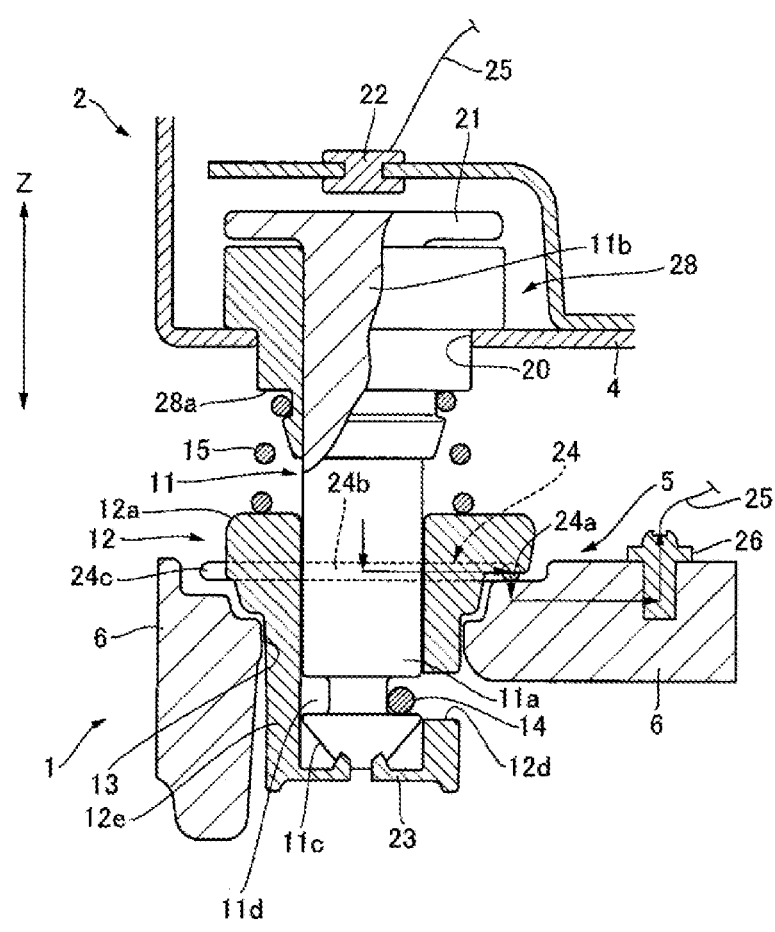
FIG. 8 is an enlarged cross-section view of the essential parts corresponding to FIG. 3 depicting a modified example of the vehicle steering wheel device according to the present invention.

FIG. 8 depicts a modified example of the vehicle steering wheel device according to the embodiment described above. This modified example differs from the embodiment described above that is provided with a damper unit 10 in that a damper unit may not be provided.

In this modified example, a holder piece 28 made of synthetic resin is provided in the attachment location of the damper unit in place of the damper unit. The elastic body described above is not incorporated into this holder piece 28.

This holder piece 28 is a single component resin molding corresponding to the inner sleeve 16, the annular piece 17, and the outer sleeve 19, which are separate parts in the embodiment described above.

The holder piece 28 is formed as a hollow cylindrical body that attaches to the housing 4 of the airbag module 2 and has an outer form corresponding to the outer sleeve. The pin 11 is slidably inserted into the holder piece 28. Furthermore, the end surface of the holder piece 28 that faces the head part 21 of the pin 11 is covered by the head part 21.

An annular seat part 28a for setting the horn spring 15 is formed on the outer surface of the holder piece 28.

In the embodiment described above, the second end 11b of the pin 11 is installed in the airbag module 2 via the damper unit. However, in this modified example, the first end 11b [sic] of the pin 11 is retained in the airbag module 2 via the holder piece 28.

The pin 11 itself is the same as in the embodiment described above. The pin 11 is inserted into the holder piece 28 so as to be slidable relative to the holder piece 28. Thus, the airbag module 2 is relatively movably connected to the steering wheel 1 by the pin 11.

The driver pushes the airbag module 2 that serves as a horn button towards the steering wheel 1 to cause the horn to sound.

The pressed airbag module 2 moves forward based on compressive elastic deformation of the horn spring 15 enabling sliding of the holder piece 28 of the airbag module 2 relative to the pin 11.

As the holder piece 28 slides, the horn contact 22 comes into contact with the head part 21 of the pin 11. The horn contact 22 coming into contact with the pin 11 energizes the conductive circuit 5 through the U-shaped spring 24 and causes the horn to sound.

When the press operation of the airbag module 2 by the driver is released, the elastic restoring force of the horn spring 15 causes the holder piece 28 to slide in the opposite direction relative to the pin 11 and the horn contact 22 to separate from the head part 21, thereby stopping sounding of the horn.

Of course, even this manner of modified example will exhibit the same function effect as the embodiment described above.

The vehicle steering wheel device described above is a preferred example of the present invention, and other Embodiments can also be implemented or carried out by various methods. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

EXPLANATION OF CODES

1. Steering wheel
2. Airbag module

5. Conductive circuit
10. Damper unit
11. Pin
11*a*. First end of pin
11*b*. Second end of pin
12. Collar member
12*a*. Flange part
12*b*. Bulging part
12*c*. Through hole
15. Horn spring
22. Horn contact
24. U shaped spring
26. Tapping screw
The invention claimed is:

1. A vehicle steering wheel device, comprising:

an elastically deformable horn spring provided between the steering wheel and an airbag module supporting the airbag module on a steering wheel; and a mounting pin member having a first end retained in the steering wheel and a second end retained in the airbag module, relatively movably connecting the airbag module to the steering wheel, wherein a conductive circuit that energizes a horn device for sounding the horn includes:

the mounting pin member being formed of a conductive material;

a horn contact provided on the airbag module that contacts with and separates from the mounting pin member due to elastic deformation of the horn spring; and an electrode member provided on a steering wheel side that clips to the mounting pin member and conducts with the mounting pin member, wherein the electrode member is configured to electrically contact the mounting pin member to provide an electrical conduction path with the mounting pin member.

2. The vehicle steering wheel device according to claim 1, wherein the airbag module is a damper mass, a damper unit is provided on the airbag module for damping vibration of the steering wheel, the damper unit is slidably provided on the second end of the mounting pin member, and the mounting pin member transmits steering wheel vibration to the damper unit.

3. The vehicle steering wheel device according to claim 1, wherein the electrode member is a U-shaped spring that sandwiches and retains the mounting pin member.

4. The vehicle steering wheel device according to claim 1, wherein a collar member for retaining the mounting pin member is provided on the steering wheel, a spring seat that is pushed toward the steering wheel by the elasticity of the horn spring is provided on the collar member, and the electrode member is retained between the spring seat and the steering wheel.

5. The vehicle steering wheel device according to claim 4, wherein the collar member is provided in a press-fit state on the steering wheel so that the spring seat pushes the electrode member toward the steering wheel.

6. The vehicle steering wheel device according to claim 4, wherein the collar member is provided with an engaging part that engages the electrode member.

7. The vehicle steering wheel device according to claim 1, wherein the electrode member conducts with a terminal provided on the steering wheel.

8. The vehicle steering wheel device according to claim 1, wherein a power supply side and grounding side of the conductive circuit are provided by a clock spring.

* * * * *